United States Patent [19]

Kreckel et al.

[11] Patent Number: 5,536,778
[45] Date of Patent: Jul. 16, 1996

[54] PRESSURE SENSITIVE ADHESIVE COMPRISING CELLULOSE

[75] Inventors: Karl W. Kreckel, Haan; Andreas H. Graichen, Hilden, both of Germany

[73] Assignee: Minnesota Mining and Manufacturing Company, St. Paul, Minn.

[21] Appl. No.: 51,053

[22] Filed: Apr. 21, 1993

[30] Foreign Application Priority Data

May 1, 1992 [DE] Germany ............... 42 14 507.4

[51] Int. Cl.⁶ .............. C08L 1/00; C08L 3/00; C08L 3/08; C08L 5/12
[52] U.S. Cl. .............. 524/733; 524/13; 524/35; 524/47; 524/55; 524/56; 524/58; 524/734
[58] Field of Search .............. 524/31, 32, 33, 524/34, 35, 47, 48, 49, 50, 51, 52, 53, 54, 55, 56, 57, 13, 15, 16, 27, 28, 58, 702, 703, 732, 733, 734; 156/328; 526/200

[56] References Cited

U.S. PATENT DOCUMENTS

| | | | |
|---|---|---|---|
| Re. 24,906 | 12/1960 | Ulrich | 206/59 |
| 2,797,201 | 6/1957 | Veatch et al. | 260/2.5 |
| 3,314,838 | 4/1967 | Erwin | 156/71 |
| 3,524,794 | 8/1970 | Jonnes et al. | 161/160 |
| 3,852,257 | 12/1974 | Harbnek et al. | 524/732 |
| 4,183,991 | 1/1980 | Smiley et al. | 524/35 |
| 4,213,885 | 7/1980 | Boberg et al. | 524/13 |
| 4,223,067 | 9/1980 | Levens | 428/308 |
| 4,710,536 | 12/1987 | Klingen et al. | 524/493 |
| 4,855,170 | 8/1989 | Darvell et al. | 428/40 |
| 5,004,767 | 4/1991 | Krause et al. | 524/48 |
| 5,004,768 | 4/1991 | Mahil et al. | 524/30 |
| 5,223,569 | 6/1993 | Schmid | 524/734 |

FOREIGN PATENT DOCUMENTS

| | | | |
|---|---|---|---|
| 3917018C2 | 8/1991 | Germany . | |
| 0020531 | 6/1978 | Japan | 525/56 |
| 0110172 | 8/1980 | Japan | 524/53 |
| 59-204673 | 11/1984 | Japan . | |
| 63-250310 | 10/1988 | Japan . | |

OTHER PUBLICATIONS

Rubber Chemistry and Technology, vol. 48, (1975), pp. 819–859.
Grant & Hackh's Chemical Dictionary, 5th Edition Mc–Graw Hill, 1987, p. 178.

*Primary Examiner*—Peter A. Szekely
*Attorney, Agent, or Firm*—Gary L. Griswold; Walter N. Kirn; Robert W. Sprague

[57] ABSTRACT

A pressure-sensitive adhesive is obtainable by a process comprising polymerizing
- an ester of acrylic or methacrylic acid having a non-tertiary alcohol comprising 4 to 12 carbon atoms in the alkyl chain (component A) in the presence of
- at least one kind of a naturally occuring polysaccharide except hydrolyzed starch, cellulose ethers and cellulose esters (component B),
- radical chain initiators (component C).

The pressure sensitive articles manufactured from the pressure sensitive adhesive have improved properties. In particular, the articles are repositionable and the adhesion under humid conditions is improved when cellulose powder is used as component B.

10 Claims, No Drawings

PRESSURE SENSITIVE ADHESIVE COMPRISING CELLULOSE

The invention concerns a pressure sensitive adhesive having a filler, a method for preparing the respective pressure sensitive adhesive, as well as products manufactured by using the pressure sensitive adhesive which products are self-supporting adhesive sheet materials, or sheet materials arranged on a flexible backing in form of a film, a tape or ribbon.

It has been known for many years that additives can alter the properties of normally tacky pressure sensitive adhesives. Tackifiers and plasticiziers have been used often to modify the adhesive mechanical properties and adhesive behaviour. Insoluble particulate or fibrous fillers have been used as well, often with the objective of reducing costs and building suitable viscosity for coating of the pressure sensitive adhesive onto a substrate.

Fillers have been found to be especially useful as additives to acrylic pressure sensitive adhesives. Known fillers for this group of adhesives are hydrophobic fumed silica, glass microbubbles, polymeric microspheres, organic filaments and glass fibers, in addition to more traditional fillers such as calcium carbonate and titanium dioxide.

Klingen et al. U.S. Pat. No. 4,710,536, discloses an acrylic pressure sensitive adhesive tape with incorporated hydrophobic silica. Such pressure sensitive adhesive tape shows an improved shear strength at elevated temperatures whereas adhesion and physical properties are maintained or improved. The hydrophobic silica preferably has a surface area from 50 to 400 m$^2$/g. A preferred acrylic pressure sensitive adhesive layer comprises copolymer of (a) at least one alkyl acrylate having an average of 4–12 carbon atoms in its alkyl group and (b) from 3 to 20% by weight of copolymerizable monomer having a polar group such as acrylic acid.

Levens discloses in U.S. Pat. No. 4,223,067 a pressure sensitive adhesive tape, the adhesive layer of which is a void-free matrix of a pressure-sensitive adhesive polymer and glass microbubbles and has the appearance of a foam-backed tape. The adhesive layer is fairly elastic under briefly applied stresses but has low elasticity under prolonged stress and hence conforms and adheres well to rough and uneven surfaces. The microbubbles having an average diameter of 10 to 200 µm and comprising 20 to 65 volume percent of the pressure sensitive adhesive layer. From this reference it is known that glass beads can be used as fine particle fillers in a polyacrylate elastomer matrix (Blackley and Sheikh "particulate reinforcement of polyacrylate elastomers", Rubber Chemistry and Technology, vol. 48 (1975), pages 819 to 859. Also other references mentioned in the reference U.S. Pat. No. 4,223,067 as, for example, U.S. Pat. Nos. 2,797,201; 3,524,794; and 3,314,838 disclose glass microbubbles as fillers.

Organic polymer substances are also known as fillers for pressure sensitive adhesives. Darvell et al. discloses in U.S. Pat. No. 4,855,170 a tape product for diverse end uses which tape is obtained by applying to a sheet backing a layer of normally tacky and pressure sensitive adhesive (PSA) containing and completely surrounding resilient non-tacky hollow thermoplastic polymeric microspheres. When the PSA is permanently bonded to the backing and the exposed surface has an irregular contour, a removable and repositionable product results. When the PSA forms a continuous matrix that is strippably bonded to the backing and is 1 mm or more thick, the resultant product is a foamlike transfer tape or foam tape. Depending on the product the PSA can contain from about ⅕ to about ⅔% by volume microspheres. From this reference also other non adhesive particles at the surface of the PSA or in the PSA are described. From the Japanese patent application JP 59-204673 there is known a pressure sensitive adhesive composition which is characterized by the fact that it is prepared in the presence of cellulose ester by polymerizing at least one type of acrylate ester having alkyl groups with 4 to 12 carbon atoms of which secondary transition point of formed polymer is lower than −25° C. or at least one type of acrylate ester having alkyl groups with 4 to 12 carbon atoms and at least one type of ethylenic unsaturated monomer which is copolymerizable with the ester acrylate.

The ratio of the components is 1 to 35 parts by weight of the cellulose ester and 99 to 65 parts by weight of the acrylate polymer.

From JP Kokai Shou 63-250310 there is known a dental adhesive composition having cellulose ether, vinyl monomers, organic peroxides, and aromatic amines or sulfinates. The compositions are suitable for dental adhesives. The disclosed compositions are reported to be useful because they do not form gaps between the prepared materials and tooth tissue and having sufficient adhesive strength between tooth tissues and the adhesive. The compositions show excellent durability even under wet conditions.

One of the drawbacks of adding particulate fillers to pressure sensitive adhesives is that the presence of the filler in cost-saving quantities often causes unacceptable changes in the adhesive properties. On the other hand fillers like fumed silica are rather expensive. A second drawback is that large quantities of fillers often greatly increase the viscosity of an adhesive or adhesive solution. This leads to difficulties for manufacturing of products like adhesive films or tapes. A further important drawback of the known fillers for acrylic pressure sensitive adhesives is that they are not biodegradable and do not contribute to an adhesive system which has improved environmental friendliness as compared to the unfilled adhesives. The organic materials like the known cellulose derivatives cannot be used as fillers for producing pressure sensitive adhesive products. Cellulosic ethers or esters substantially reduce the adhesive properties of the pressure sensitive adhesive.

DE 39 17 018 C2 discloses a self-adhesive and conductive elastic gel for manufacturing of electrodes which are placed on a patient's body. These electrodes are reusable. They are manufactured by polymerizing acrylic monomers like acrylic or methacrylic acids or esters thereof in the presence of starch like amylopectin with molecular weight in between 300,000 and 2,000,000. Since these gels have to be conductive there is also present an electrolyte in amounts of 3 to 30% by weight. Although these materials are to some extent tacky, they cannot serve as pressure sensitve adhesives because they do not show the necessary adhesive and mechanical properties.

Mahil et al. describes in U.S. Pat. No. 5,004,768 a self-adhesive sheet material having an adhesive composition comprising the polymer of an acrylic ester of saturated alcohol with 2 to 12 carbon atoms, a surfactant and dextrin. This dextrin is hydrolyzed starch and readily soluble in water. When the proportion of dextrin is within the range of 4 to 30% by weight based on the weight of the components specified and, especially, when the alcohol has at least 4 carbon atoms the adhesive provides pressure sensitive releasable articles, e.g. label or tapes. The surfactants like organic sulphates or organic sulphonates or phosphates which are essential ingredients of the self-adhesive sheets of U.S. Pat. No. 5,004,768 are not without environmental impact when incinerated. Sulphoxides may be generated during incineration for example.

Normally tacky acrylic pressure sensitive adhesives are usually copolymers containing a larger amount of nonpolar acrylate ester and smaller amounts of a reinforcing comonomer which serves to increase the cohesive strength of the adhesive mass (Ulrich, U.S. Pat. No. Re 24,906). Reinforcing comonomers have long been known to contribute to the water-sensitivity of acrylic pressure sensitive adhesive. Thus, there is a need for a mechanism of increasing cohesive strength of acrylic pressure sensitive adhesive without using traditional reinforcing comonomers which promote water-sensitivity.

An object of the present invention is to provide materials for pressure sensitive adhesives which can be present in considerable amounts and do not effect adversely the adhesive properties of the pressure sensitive adhesive.

Another object of the invention is to provide materials which even improve the properties of pressure sensitive adhesives like increasing the cohesive strength of the adhesive mass without using certain amounts of reinforcing comonomers which have been found to be essential in the pressure sensitive adhesives of prior art. Yet, another object is to provide materials for pressure sensitive adhesives which do not grossly alter the adhesive properties such as adhesive strength or viscosity or cause water-sensitivity and which are based on low-cost, biodegradable, environmentally friendly and naturally renewable resources. Ideally, these materials would not only avoid the known disadvantages of existing fillers but would contribute new and improved characteristics to the pressure sensitive adhesive as well.

The present invention provides a pressure sensitive adhesive obtainable by polymerizing an ester of acrylic or methacrylic acid having a non-tertiary alcohol comprising 4 to 12 carbon atoms in the alkyl chain (component A) in the presence of at least one kind of a naturally occuring polysaccharides which is not a hydrolyzed starch, a cellulose ether or a cellulose ester (component B), radical chain initiators (component C).

Component A of the invention comprises acrylic or methacrylic esters of acrylic acid or methacrylic acid with non-tertiary alkyl alcohols which are mentioned in Ulrich U.S. Pat. No. Re 24,906. In particular this are n-butanol, n-pentanol, isopentanol, 3-pentanol, 2-methylbutanol, 1-methylbutanol, 1-methylpentanol, 2-methylpentanol, 3-methylpentanol, 2-ethylbutanol, 3,5,5-trimethylhexanol, 3-heptanol, isooctanol, n-decanol, dodecanol and the like.

Component B is a material of naturally occuring polysaccharides or at least derived from natural sources. The term polysaccharide is understood according to the invention as macromolecular carbohydrate like starch, cellulose, glycogen, dextran which are polymeric structures of glucose. Naturally occuring polysaccharides are also rubbers such as polygalactomannanes, e.g. guar-gum. According to the invention also polysaccharides such as inulin, chitin or mucopolysaccharides can be used. Of course, depending on the manufacturing methods and/or source of the polysaccharides other components might be present in small amounts.

Preferably, component B is basically cellulose, starch and/or cotton fibers, flax fibers or fibers of ramie, especially such naturally occuring polysaccharides which are not modified covalently.

Particularly preferred is a cellulose derived from wood. According to the invention the fiber length of the cellulosic fibers is smaller than 2,000 µm. Especially preferred is a fiber length of the natural polysaccharide fibers in the range of 10 to 200 µm.

The powdered cellulose of wood which is preferred according to the invention is a form of purified cellulose (about 99.5% pure) which has been derived from wood pulp and which has been mechanically ground and sorted into various size classes by sieving. The type of cellulose powder preferably used shows 99% of fibers having less than 30 µm in length.

Commercially available are several other grades with longer fibers and various size distribution profiles. For example TechnocelR (C.F.F. Cellulose-Füll-stoff-Fabrik, Mönchen-gladbach, Germany) is a commercially available cellulose powder. According to the invention it is advantageous to use cellulose having an aspect ratio (ratio of length/diameter) of the less than 5. According to the invention also fibers of plants can be utilized such as derived from cotton, flax or ramie. The cellulose derived from cotton can be readily isolated since the cotton is enriched with cellulose. When cotton fibers are used, the pressure sensitive adhesive of the invention contains preferably also fumed silica.

Another preferred polysaccharide-fiber material according to the invention is potato starch and cationically modified corn starch. Preferably the length of the starch particles is in the range of 10 to 200 µm. Commercially available are various types of starch. For example cationically modified corn starch is available from Staley, Decatur, Ill.

The effect of the cellulosic material on the properties of the pressure sensitive adhesive can vary considerably depending on whether or not a reinforcing comonomer (component D) is present. In systems where no reinforcing comonomer is present, the cellulosic material seems to toughen the adhesive and substantially increase the elongation at break. Static shear behaviour is improved steadily with increasing amounts of cellulosic material and peel adhesion remains relatively constant. Another advantage of component B of the present invention is that viscosity of the prepolymerized syrup is only modest.

It is suitable to use radical chain inititators (component C) in the polymerization reaction for manufacturing the pressure sensitive adhesive of the invention. Photoinitiators suitable for the process are those as for example used in the polymerization of vinyl compounds. Among the well-known photoinitiators of this type are the acyloin ethers (such as benzoin ethyl ether, benzoin isopropyl ether, anisoin ethyl ether and anisoin isopropyl ether) substituted acyloin ethers (such as α-hydroxymethyl benzoin ethyl ether), Michler's ketone (4,4-tetramethyl diamino-benzophenone). Particularly preferred is 2,2-dimethoxy-2-vinylacetophenone photoinitiator ("Irgacure" 651).

As thermal chain initiators there can be used those as for example described by Ulrich U.S. Pat. No. Re. 24,906. Suitable free radical chain initiators which may be utilized include azo compounds such as 2,2-azobis(isobutyronitrile) or hydroperoxides such as tert-butylhydroperoxide, peroxide such as benzoyl peroxide or cyclohexanone peroxide.

In the pressure sensitive adhesive composition of the present invention it can be advantageous to copolymerize a comonomer having a polar group and being copolymerizable with component A. This comonomer (component D) comprises preferably acrylic acid, methacrylic acid, itaconic acid, maleic acid or their amides and/or N-vinyl-2-pyrrolidone (NVP) and the like as mentioned for example in U.S. Pat. No. 4,612,242.

The shear strength of the pressure-sensitive adhesive increases with increasing amounts of acrylic acid.

A further component being preferably present in the pressure sensitive adhesive of the invention is a crosslinking agent (component E). The crosslinking increases the cohesive strength of the adhesive.

For example as photoactive crosslinking agents can be used benzaldehyde, acetaldehyde, anthraquinone, substituted anthraquinones, various benzophenone-type compounds and certain chromphore-substituted vinyl-halomethyl-s-triazine, such as 2,4-bis(trichloromethyl)-6-p-methoxystyryl-s-triazine.

A thermally activatable crosslinking agent is preferably a polyacrylic functional monomer like trimethylolpropane triacrylate, dipentaerythrytolhydroxypentaacrylate, ditrimethylolpropanetetraacrylate, hexafunctional polyesteracrylate, tetra-functional polyesteracrylate and triethyleneglycoldi-acrylate. Particularly preferred as crosslinking agent are 1,6-hexandioldiacrylate (HDDA) or tripropylglycoldiacrylate (TPGDA).

The pressure sensitive adhesive of the invention comprises component A in amounts of from 60 to 100% by weight, preferably 75 to 100% by weight, and more preferable 90 to 100% by weight. Component B is present in amounts of from 0.1 to 70 parts per hundred resin (phr), preferably 5 to 55 phr, and more preferably 15 to 45 phr. The free radical chain initiators (component C) are preferably present in amounts of from 0.02 to 1.0 phr based on the sum of components A and D. Component D according to the present invention is preferably present in amounts of 0 to 40% by weight, preferably 0 to 25% by weight, more preferably 0 to 10% by weight based on total amounts of components A and D. Optionally component E is present in amounts of from 0.02 to 2.0 phr, preferably 0.05 to 1,0 phr, and more preferably 0.1 to 0.75 phr based on the sum of components A and D.

Component D can be partially replaced by small amounts of other vinylic monomers (without altering the character of the invention) up to an amount of 50% by weight based on their maximum amount of polar component D or 20% by weight based on total amount of components A and D.

In systems where e.g., acrylic acid is present as reinforcing comonomer in the pressure sensitive adhesive of the invention tensile strength increases steadily with increasing amounts of filler. Percent elongation at break raised initially as compared to control is and than begins to drop of steadily. When N-vinylpyrrolidone is used as a comonomer, tensile strength increases and elongation raised only minimally as increased amounts of filler are added.

Overall, however, changes in the tensile and elongation properties appear to be advantageous while the adhesive behaviour as measured by shear and peel adhesion is effected more positively than negatively. The polysaccharide materials as compared to known fillers appears to improve certain properties like elongation and tensile strength without disturbing the delicate balance of adhesive and cohesive strengths required for pressure sensitive adhesive.

Additionally, other additives like tackifiers and plasticizers as well as fillers including fumed silica, glass microbubbles, polymeric microspheres, glass and polymeric fibers can be present in a pressure sensitive adhesive of the invention. As tackifiers there might be used rosin or rosin derivatives, preferably. The amount of additives preferably does not exceed 50 phr based on the sum of components A and D.

Also coloring agents such as pigments can be used in the pressure sensitive adhesive of the present invention.

These pigments can be present in small amounts from 0.01 to 1.0 phr (parts per hundred resin).

Also chain transfer agents including mercaptans such as thioglycolic acid can be used for controlling the chain length of the polymer as well as others mentioned in Young et al. U.S. Pat. No. 4,833,179.

Basically, the pressure sensitive adhesive of the present invention can be prepared by different polymerization methods. The free-radical polymerization may be carried out in the complete absence of solvent, in the presence of organic solvent or as an aqueous dispersion. The polymerization may be initiated and carried out by means of radiation activated polymerization initiators such as those activated by UV-light or by thermal polymerization initiators or by the use of two different types of initiators in sequence. However, it is essential that a substantial part of the free-radical polymerization of the monomers and crosslinkers, if present, takes place in the presence of the naturally occuring polysaccharide fibers.

Preferably, the polymerization reaction takes place in the absence of solvent. In this particular mode preferably the following steps are involved which are partially polymerizing the monomers to a slightly viscous syrup, adding the naturally occuring polysaccharide fibers, additional initiator and optional additives, followed by polymerizing the remaining monomers substantially to completion.

The partially polymerized syrup can be formed by thermal or radiation induced methods. Thermal or photochemical initiators are added to the polymerization monomers and the polymerization is initiated thermally or by means of radiation depending on the initiator used. After the monomers have polymerized to the extent to provide a viscosity of approximately 1 to 3 Pas (1,000 to 3,000 mPas). The polymerization may be stopped either by removal of the radiation or heat source and/or introduction of for example radical-scavenging oxygen. A mixture of monomers is initially of such low viscosity that it cannot be coated uniformly at typical thicknesses and so should be partially polymerized to a syrup of coatable viscosity. This can also be done before the natural polysaccharide fibers (component B) of the invention are added. However, if higher amounts of the polysaccharide fibers are used it is also possible to avoid the prepolymerization of the monomers to a more viscous syrup.

The UV irradiation occurs preferably with a radiation wavelength within the 300 to 400 nm (3,000 to 4,000 A°) range. Preferably the radiation in the near ultraviolet region takes place at an intensity of from 0.1 to 7 milliwatts/cm2 of the mass exposed.

The syrup obtained by partial photopolymerization is coated preferably with a knife-coater between a pair of removable supports. The removable supports are preferably biaxially oriented plastic films having the facing surfaces with e.g. low adhesion silicone coatings. The removable support is preferably polyethylene-terephthalate film. It is also possible to use just one removable support on which the partially polymerized syrup is coated.

In another method of conducting the polymerization in the absence of solvent the monomers, naturally occuring polysaccharide materials, polymerization initiators and optionally the additives are combined and the monomers are polymerized substantially in one step without formation of a syrup and without addition at any intermediate stage of the polymerization reaction.

In either of the two methods as described above the polysaccharide fibers must be mixed with the monomers either in their unpolymerized or partially polymerized form before the bulk of the polymerization reaction takes place. Materials of the invention of component B with relatively small particle size such as cellulose powder and starch allow themself to be dispersed into syrups and monomers rather easily while others such as the longer cotton fibers require different techniques. In order to disperse cotton fibers homogeneously it is preferred to mix them first with particles such as fumed silica before addition to the polymerization mixture takes place.

In the process as described above it is preferred to add additional initiators before the polymerization reaction can be carried to completion. Polymerization initiator added at an intermediate step can be of the thermal or preferably the photochemical type. It can therefore be seen, that one could combine thermal and photochemical polymerization techniques using for example thermal polymerization to form a syrup followed by a photochemical polymerization for the larger part of the polymerization reaction or vice versa.

Also other additives may be added at the intermediate polymerization point at which a slightly viscous syrup has been formed. This is preferred because in the slightly viscous partially polymerized syrup the additives are held in a homogeneous fashion more easily. The settling out of the mixture is prevented and the need for constant stirring of the reaction mixture is reduced.

Typically, the solution polymerization takes place in a suitable organic solvent. A preferred method for solvent polymerization is described in U.S. Pat. No. Re. 24,906 (Ulrich). Component A of the present invention and optionally component D are dissolved in a suitable organic solvent and then mixed together with the polysaccharide fibers of the invention and the crosslinking agent as well as radical chain initiator. The polymerization reaction is started and carried substantially to completion. The polymerization may be carried out under thermal conditions or using radiation methods.

The organic solution of the adhesion is cast on a supporting film or paper using customary coating methods. The organic solvent is then removed by drying to form a layer of pressure sensitive adhesive.

A third possibility for preparing the pressure sensitive adhesive mass is by polymerizing in an aqueous suspension system. In this method a premix is made by combining the essential components of the invention, components A, B, C and optionally D and E as well as additives, combining the premix with a water phase containing a sufficient amount of suspending agent to form a suspension. The suspension is concurrently agitated and polymerization of the polymer premix is permitted until polymer beads are formed. The beads are then collected.

Suspensions of the pressure sensitive particles in aqueous medium can also be coated by known methods to form pressure sensitive articles and films. The technology of preparing the pressure sensitive adhesive in suspension is described in Young et al. U.S. Pat. No. 4,833,179.

According to the process of the invention a self-supporting sheet material comprising the pressure sensitive adhesive of the invention can be obtained. Preferably the self-supporting sheet material is a sheet, or a ribbon-shaped article.

According to the invention the sheet material can also be arranged on a flexible backing sheet. The sheet material of the invention either in self-supporting form or with flexible backing can be protected with a protective sheet opposite to the backing sheet.

General advantages of the pressure sensitive adhesive of the invention having polysaccharide materials are related with the displacing of the acrylic parts of the pressure sensitive adhesive of the prior art. The pressure sensitive adhesive of the present invention is environmentally more friendly than those of the prior art because they contain, in a substantial amount, a natural product which is the polysaccharide material. By using the polysaccharide fibers quasi as a filler less acrylic monomers must be used. Furthermore, the polysaccharide materials are supplied by renewable, natural sources. The manufacturing of the pressure sensitive adhesive becomes more economical.

The processing and handling of the naturally occuring polysaccharide fibers during the manufacturing of the pressure sensitive adhesive is nonproblematic and easy. High loadings of the polysaccharide fibers of the invention into the pressure sensitive adhesive do not have nearly the detrimental effect on adhesive properties that have come to be expected with fillers of prior art.

During the manufacturing process high loadings of the polysaccharide fiber do not produce uncoatable viscosities of the photopolymerized syrup as it is known especially from fumed silica fillers. Moreover, the polysaccharide materials are easily dispersible and cannot be damaged by mixing operations as glass fibers and hollow glass microbubble fillers.

Subsequent converting operations of articles comprising the pressure sensitive adhesive of the invention such as die-cutting and slitting is quite easy. The improved mechanical properties of the pressure sensitive adhesive of the invention is an increased tensile strength and an increased elongation at break.

The appearance of the pressure sensitive adhesive of the present invention is translucent and can be modified with pigments and dyes. A preferred embodiment of the invention is a sheet shaped or ribbon shaped article composed of partially crosslinked component A and cellulose powder, however, containing no reinforcing comonomer (component D). This article can be used for a number of simple mounting applications which were previously inaccessible. These involve mounting of light weight objects on vertical surfaces where it is imperative that the mounting process be completely reversible i.e. the adhesive product must be removable from the substrate and the mounted object without leaving residue or damaging either of the surfaces. For example the field of use includes temporary mounting of flip chart on walls of conference rooms, automotive applications as temporary mounting of licence plates or frames, mounting of signs, nameplates and posters, mounting of decorative strips on large windows and so on.

It seems to be very important to note that the pressure sensitive adhesive of the present invention as present in this embodiment is removable from various kind of surfaces including paper and sheet rock. Another advantage of the pressure sensitive adhesive of the present invention is the controllability of adhesive properties and excellent low temperature adhesion especially when no reinforcing comonomer is included. The pressure sensitive adhesive of the invention exhibits good conformability and softness which contribute to the ability to wet and adhere to rough surfaces. A further advantage is the low sensitivity to contamination of the surface. The adhesive can be touched repeatedly during application or repositioning, hardly altering the adhesive properties. It is also noteworthy that the article can be used in an unsupported form because of its self-supporting properties. A preferred product form is an unsupported adhesive layer between two removable protective sheets.

Another configuration of the pressure sensitive adhesive of the invention is an article which is based on a copolymer of component A and component D together with cellulose powder or starch (component B) as well as component C and E. Products based on this pressure sensitive adhesive show excellent adhesive properties under humid conditions. Also articles based on the pressure sensitive adhesive composition having cotton fibers as naturally occuring polysaccharide fibers are advantageous. One aspect of application is the use as transfer tapes. The cotton fibers replace breakable glass fibers.

The following tests were used for evaluated tapes of the invention.

Viscosity

Viscosity of partially polymerized syrups was measured to show the effect of adding fillers. Data was measured at room temperature with a standard Brookfield viscometer type RVT using different spindles depending on the viscositiy of the sample. Data is given in milliPascalseconds (mPas).

Static Shear

This test is based on PSTC Method PSTC-7 (Procedure A), a well-known industry standard available from the Pressure Sensitive Tape council of Glenview, Ill., U.S.A. All measurements of this type were made at room temperature. The adhesive layer to be tested was produced by photopolymerizing the prepolymerized syrup between two layers of siliconized biaxially oriented polyethylene terphthalate (PET) film. One layer of PET was removed and replaced by a 140 µm thick layer of anodized aluminum sheet. The second layer of PET was then removed, yielding an adhesive tape with an aluminum backing which was used in the static shear test.

Adhesive failure (AF) indicates that the adhesive separated cleanly from the test substrate upon failure. Cohesive failure (CF) indicates that the adhesive mass failed cohesively, leaving adhesive residues on both the test substrate and the aluminum backing.

All shear measurements were made using samples of 1.27 cm×1.27 cm unless otherwise noted.

A. From Stainless Steel

A 1.27 cm wide strip of tape prepared by the method just described was adhered to a flat, rigid stainless steel plate with an exactly 1.27 cm length of tape in contact with the panel. The total bonded area was then 1.27 cm×1.27 cm. Before testing, a 1,000 g weight rested over the bonded area for 15 minutes (differs from the PSTC Method where a rubber-coated roller was used to bond the samples to the panel). Then the panel with the adhered tape test sample was placed in a special stand tilted at two degrees from vertical. A weight of 1 kg was hung from the free end of the tape. The time required for the weight to fall is the Static Shear Value in minutes. If no failure occured within 10,000 minutes, the test was discontinued.

B. From Paper

The method above was followed except that the stainless steel panel was covered by a piece of photocopier paper and a weight of 250 g was used. The paper was bonded to the panel with a double-coated adhesive tape.

C. From Sheetrock

The method of A was followed except that a piece of sheetrock was used as a substrate. The sheetrock was also securely adhered to the stainless steel panel with double-coated tape. A 250 g weight was used.

D. From sheetrock (elevated temperature)

The method C of above but at 70° C.

90 deg. Peel Adhesion

A modified version of PSTC Method PSTC-3 intended for double-coated tapes was used for this test. This well-known method is available from the Pressure Sensitive Tape Council of Glenview, Ill., U.S.A. The peel measurements were made at 90 degrees rather than 180 and an anodized aluminum film was substituted for the polymeric film backing normally used for this test. All peel adhesion measurements are given in Newtons per decimeter (N/dm).

The adhesive layer to be tested was produced by photopolymerizing the prepolymerized syrup between two layers of siliconized biaxially oriented polyethylene terephthalate (PET) film. This laminate was cut to a width of 1.27 cm. After removal of one layer of PET, the adhesive was adhered to a smooth stainless steel plate. The second layer of PET was removed and a 1.60 cm wide 140 micron thick anodized aluminium strip was adhered to the adhesive under a weight of a 2.04 kg hard rubber-covered steel roller with 2 passes in each direction. The values of the examples are each determined from three measurements.

A. From stainless steel, short dwell time

After 20 minutes "90 deg peel adhesion" was measured by moving the free end of the aluminium strip away from the stainless steel plate at 90 deg and at a rate of 300 mm per minute using a tensile tester.

B. From stainless steel, long dwell time

The test was performed as above except that the sample remained in contact with the stainless steel plate for 3 days before the measurement was made.

C. From glass after aging

The test was performed as in A, except that a smooth glass substrate was used as the test surface. Dwell time at room temperature was 3 days.

D. From glass after aging in water

The test was performed as in C, except that the samples adhered to glass were immersed in water heated to 70° C. for 3 days. At the end of the test period, the sample was cooled by adding cold water to the water bath. The samples were then removed from the water and tested immediately.

E. From glass after aging at 100% humidity

The test was performed as in C, except tht the samples adhered to glass where exposed to 100% relative humidity at 40° C. for one week.

F. From paper, short dwell

Peel adhesion from photocopier paper was measured after a 20 minute dwell time. The paper was 90 µm clay-coated paper with a weight of 90 g/sq. meter.

G. From paper, long dwell

Peel adhesion was measured exactly as in F, except that the sample was allowed to remain adhered to the paper substrate for 3 days before the measurements were made.

H. From Sheetrock, short dwell (20 min)

Sheetrock is a gypsum/cardboard laminate commonly used for interior walls of buildings. Samples used for the test were about 1 cm total thickness with about 300–400 µm cardboard on each side. The construction was painted on one side with white interior latex wall paint and dried as prescribed. The painted sheetrock surface was used as a substrate for the test.

I. From Sheetrock, long dwell (3 days)

Samples were adhered to sheetrock as described above and allowed to remain for 3 days before testing.

J. From Plasticized PVC, short dwell (20 min)

Polyester reinforced plasticized polyvinylchloride was also evaluated as a substrate to measure the adhesive's resistance to plasticizer migration. COMPLAN B 129 334 (yellow) in a thickness of 550 microns was obtained from Verseidag Industrial Textiles in Krefeld, Germany. The polyvinyl chloride is plasticized with large amounts of dioctylphthalate.

K. From Plasticized PVC, long dwell (3 days)

The test is conducted as above, except that the sample is allowed to remain for 3 days before the peel adhesion is measured.

L. From stainless steel after aging at 100% humidity

Same method as described under lit E except from stainless steel.

Tensile Strength At Break/Elongation At Break:

Tensile and Elongation was measured according to German Industry Standard DIN 53455 except that the test tape was 1.27 cm wide.

The tests were performed using unsupported layers of pressure sensitive adhesives which were prepared by photopolymerization between two transparent polymeric films as described previously. No polymeric film backing or aluminum substrate was used with the adhesive in the tensile and elongation test.

The adhesive sample was cut to width of 1.27 cm and a length of about 100 mm. Both ends of the sample were protected with masking tape and fixed to the clamps of a tensile tester. The distance of the clamps was adjusted to 70 mm. The sample was torn with a speed of the upper clamp of the tensile tester of 300 mm per minute. Tensile strength was recorded as the force required at break of the sample in units of Newtons per square millimeter (N/mm2).

Elongation was recorded as length of the sample at break compared to the original sample length of 70 mm. The units of "elongation at break" are percent (%).

Polysaccharide materials

The polysaccharide materials of the invention are unmodified cellulose fibers, and starch fibers like potato starch as well as cotton fibers. Specific properties of unmodified cellulose fibers as well as the starch are given in the following table.

TABLE A

| Unmodified Cellulose Materials | | | | | | | | |
|---|---|---|---|---|---|---|---|---|
| Material Code | Brand Name | \multicolumn{7}{c}{Screen Index (Part % less than [μm])} |
| | | 32 | 90 | 200 | 300 | 600 | 800 | 1,500 |
| A | Technocel 30/1 | 99 | — | — | — | — | — | — |
| B | Technocel 90 | 65 | 99 | — | — | — | — | — |
| C | Technocel 150 | 55 | 95 | — | — | — | — | — |
| D | Technocel 1500 | 28 | 65 | — | — | — | 96 | — |
| E | Technocel 2500 | 10 | — | 45 | — | — | — | 97 |
| H | Technocel 300BL | 20 | 70 | — | 99 | — | — | — |

Typical analysis values:

| | |
|---|---|
| Cellulose cont | min. 99% |
| Humidity | about 7% |
| Ash | max. 0.3% |
| pH-value | 6 ± 1 |
| Heavy metals | max. 10 ppm |

Supplier: Cellulose-Füllstoff-Fabrik CFF, Fleenerweg 2, 4050 Mönchengladbach 1, Germany.

Starch used in the examples:

Material F, potato starch (Sigma Inc.), St. Louis, Mo., U.S.A.

Material G, cationically modified corn starch (Staley, Decatur, Ill., brand name STA-LOK 356).

Material H, Technocel 300 BL (CFF, as above) cotton lint 300 μm, diameter about 25 μm.

For evaluating comparative data showing the improved properties of the composition of the invention over those obvious from prior art the following materials have been used in the comparative experiments as mentioned in table 15.

Material J, hydrophobic silica (Degussa, Frankfurt, Germany, brand name Aerosil R 972).

Material K, methyl cellulose (Aqualon, Düsseldorf, Germany, brand name MC 7000 PF).

Material L, cellulose aceto-butyrate (Eastman Chemical Company, Kingsport, Tenn., brand name CAB-381-0.1).

Material M, cellulose aceto-butyrate (Eastman Chemical Company, Kingsport, Tenn., brand name CAB-381-0.5).

The pigment used in all examples when pigment is present was ER4946 Perma link gelb (Sinclair and Wellentin, 6902 PE, Zevenar, Netherlands). It was an organic pigment dispersion in ethanol.

A general procedure of making the pressure sensitive adhesive of the invention is by a partially photopolymerizing the monomeric components A or optionally D in presence of a photoinitiator (component C) such as Irgacure 651 (Ciba Geigy, Basel, Switzerland). The partial photopolymerizing was accomplished in an inert (nitrogen) atmosphere using a bank of 40 watt fluorescent black lights (General Electric HID H400A-33-1) to provide coatable syrups of a viscosity (Brookfield) of about 1.5 Pas (1,500 mPas). A further amount of photoinitiator like Irgacure 651 was added to the syrup and thoroughly mixed. Crosslinker (component E) was added as well as component B and other fillers if present. Each mixture was coated using a conventional knife-coater between two biaxially oriented polyethyleneterephthalate films and irridiated with the same fluorescent lamps to provide pressure sensitive adhesive layers.

Alternatively the syrup can be formed by thermal prepolymerization using thermal initiators such as benzyl peroxide at a level of approximately 0.01 to 0.02% by weight based on monomers as known in the art.

EXAMPLES 1 to 4

100 parts by weight of isooctylacrylate (IOA) were partially polymerized by UV-light to form a syrup of a coatable viscosity of about 2 Pas (2,000 mPas). Then various amounts of material type A as given in table A, 0.18 phr of tripropylglycoldiacrylate (TPGDA), 0.2 phr Irgacure 651 and 0.1 phr yellow pigment (ER 4945) were added to the syrup followed by mixing with a lab stirrer for 90 minutes. The coating and curing of the syrup was performed between two siliconized polyester sheets. The level of radiation dosage was 800 to 1,000 mJ/cm2. The presence of the powdered cellulose and yellow pigment did not interfere with the UV polymerization process significantly.

The samples were prepared at a thickness of 0.8 mm. The adhesive was diecut to the desired shape in size (circles having diameters of 2.54 cm and 5.08 cm). The colored adhesive mass was translucent yellow in its final form. In a control experiment (contr. 1) no cellulose powder was present.

Table 1 shows the effects of varying the amount of cellulose powder.

TABLE 1

| Ex. | Material Type | Loading (phr) | 90° peel (N/dm) AdhA | AdhB | AdhF | AdhG | Static Shear (min) B | C | Tensile (N/mm$^2$) | Elong. % |
|---|---|---|---|---|---|---|---|---|---|---|
| 1 | A | 10 | 102 | 117 | 97 | 109 | 976 | 972 | 0.61 | 1,498 |
| 2 | A | 20 | 96 | 106 | 85 | 101 | 4,596 | 5,471 | 0.63 | 1,353 |
| 3 | A | 30 | 94 | 106 | 82 | 95 | 3,703 | 6,859 | 0.55 | 1,208 |
| 4 | A | 40 | 90 | 102 | 71 | 86 | 5,445 | 10,000+ | 0.55 | 1,113 |
| Contr. 1 | — | — | 94 | 123 | 103 | 110 | 553 | 2,892 | 0.2 | 1,050 |

Static shear B and C are averaged from 5 measurements.
90° peel values, tensile strength and elongation are averaged from 3 measurements.

EXAMPLES 5 to 11

Examples 5 to 11 were prepared using a syrup generated by the UV method described for examples 1 to 4. Material type A (Technocel 30/2, cellulose powder) was present at 40 phr in each of examples 5 to 11 as well 0.1 phr photointiator (Irgacure 651). The radiation polymerization was conducted as described in examples 1 to 4.

Table 2 shows the effect of variation of the level of crosslinker 1,6-hexandioldiacrylate (HDDA).

TABLE 2

| Ex. No. | HDDA | 90° peel (N/dm) | | Static shear (min) | | Tensile | Elongation |
|---|---|---|---|---|---|---|---|
| 5 | 0.13 | 53 | 63 | 10,000+ | 10,000+ | 0.55 | 852 |
| 6 | 0.18 | 34 | 33 | 835 | 2,174 | 0.58 | 554 |
| 7 | 0.23 | 27 | 19 | 241 | 285 | 0.60 | 448 |
| 8 | 0.28 | 19 | 17 | 187 | 69 | 0.62 | 328 |
| 9 | 0.33 | 14 | 13 | 211 | 16 | 0.69 | 270 |
| 10 | 0.38 | 14 | 17 | 224 | 17 | 0.76 | 245 |
| 11 | 0.43 | 13 | 13 | 59 | 24 | 0.75 | 212 |

Static shear was measured using samples measuring 1.27 cm × 2.54 cm.

EXAMPLES 12 to 14

The pressure sensitive adhesive of Examples 12 to 14 was prepared according to the method of Examples 1 to 4 but adding additionally a polar comonomer which has been acrylic acid (AA) in varying amounts. The IOA/AA mixture with the amounts as listed in table 3 was prepolymerized until a syrup was built up. Then the polysaccharide material and the other ingredients were added.

The amount of Irgacure 651 was 0.1 phr, the amount of HDDA was 0.13 phr and cellulose powder was present in amounts of 20 phr in each experiment. The cellulose powder was of type A (table A).

TABLE 3

| Ex. No. | IOA % by weight | AA % by weight | 90° peel (N/dm) Adh. A | Adh. F | Static shear (min) Shear D |
|---|---|---|---|---|---|
| 12 | 98 | 2 | 65 | 71 | 375 |
| 13 | 96 | 4 | 68 | 80 | 184 |
| 14 | 94 | 6 | 74 | 82 | 620 |

EXAMPLES 15 to 24

In experiment 15 to 19 the amount of IOA was 94% by weight, the amount of AA was 6% by weight and in experiment numbers 20 to 24 the respective amount of IOA was 90% and that of AA was 10% by weight. In Examples 15 to 19 the syrup has been produced by photopolymerisation whereas in Examples 20 to 24 the syrup has been produced by thermal prepolymerization. In all experiments the amount of photoinitiator was 0.1 phr, the amount of cellulose powder was 40 phr. The cellulose powder was selected from the A type. The pigment was present in 0.1 phr.

Table 4 shows the variation of the crosslinker HDDA in the system of Example 14.

TABLE 4

| No. | HDDA phr | 90° peel adhesion (N/dm) Adh. A | Adh. F | Static shear (min) Shear B | Shear C |
|---|---|---|---|---|---|
| 15 | 0.13 | 64 | 66 | 10,000+ | 10,000+ |
| 16 | 0.18 | 54 | 50 | 10,000+ | 10,000+ |
| 17 | 0.23 | 49 | 44 | 10,000+ | 10,000+ |
| 18 | 0.28 | 50 | 39 | 1,815 | 3,259 |
| 19 | 0.33 | 48 | 36 | 1.577 | 2,138 |
| 20 | 0.13 | 114 | 35 sp | | 10,000+ |
| 21 | 0.18 | 106 | 35 sp | | 10,000+ |
| 22 | 0.23 | 102 | 36 sp | | 10,000+ |
| 23 | 0.28 | 102 | 37 sp | | 10,000+ |
| 24 | 0.33 | 99 | 38 sp | | 10,000+ | sp indicates that fibers were removed from the paper substrate.

EXAMPLES 25 to 29

Examples 25 to 29 were prepared as described under Examples 20 to 24 using the IOA/AA 90/10 system (thermal syrup).

Table 5 shows the effect of adding cellulose powder to a 90/10 IOA/AA system.

TABLE 5

| Ex. No. | Material Type | Loading (phr) | Viscosity (mPas) | 90° Peel Adh. A (N/dm) | Static Shear A (min) | Tensile (N/mm²) | Elong. (%) |
|---|---|---|---|---|---|---|---|
| Contr. 2 | none | 0 | 7,920 | 226 | 10,000+ | 0.62 | 606 |
| 25 | A | 10 | 9,780 | 205 | 10,000+ | 1.13 | 657 |
| 26 | A | 20 | 13,000 | 183 | 10,000+ | 1.65 | 590 |
| 27 | A | 30 | — | 166 | 10,000+ | 1.50 | 478 |
| 28 | A | 40 | 46,400 | 146 | 10,000+ | 1.74 | 458 |
| 29 | A | 53 | — | 102 | 10,000+ | 2.13 | 270 |

Examples 30 to 33

N-vinylpyrrolidone was used in amounts of 10 by weight whereas the acrylic ester isooctylacrylate was present in amounts of 90% by weight. Table 6 demonstrates the effects of the addition of cellulose powder in this system. The crosslinker was HDDA in amounts of 0.12% by weight. The syrup was prepared by photoprepolymerization. The amount of photoinitiator Irgacure 651 was 0.1% by weight. The polymerization was carried out according to the method of Examples 1 to 4.

TABLE 6

| Ex. No | Material Type | Loading (phr) | 90° Peel Adh. A (N/dm) | Tensile (N/mm2) | Elongation (%) |
|---|---|---|---|---|---|
| contr. 3 | none | 0 | 93 | 0.42 | 740 |
| 30 | A | 6.7 | 87 | 0.51 | 750 |
| 31 | A | 13.3 | 84 | 0.68 | 747 |
| 32 | A | 20.0 | 78 | 0.85 | 813 |
| 33 | A | 26.7 | 65 | 0.91 | 811 |

Examples 34 to 37

A pressure-sensitive composition was polymerized by the method as described in Examples 1 to 4, however, using different types of starch as well as different levels of one type of starch. Table 7 summarizes the results. These values demonstrate that also starch is a suitable natural polysaccharide material of the present invention. Also in this system the basic effects can be observed to be similar to those obtained with cellulose powder.

The monomer ratio in this Example was 90/10 IOA/AA. The amount of crosslinking agent HDDA was 0.14 % by weight.

TABLE 7

| Ex. No. | Material Type | Loading (phr) | 90° Peel Adh. A (N/dm) | Static Shear (min) | Tensile (N/mm²) | Elongation (%) |
|---|---|---|---|---|---|---|
| Contr. 3 | none | 0 | 65 | 10,000+ | 0.26 | 750 |
| 34 | F | 20 | 64 | 10,000+ | 0.51 | 700 |
| 35 | F | 30 | 67 | 10,000+ | 0.55 | 712 |
| 36 | G | 20 | 62 | 10,000+ | 0.64 | 662 |
| 37 | G | 30 | 60 | 10,000+ | 0.72 | 600 |

EXAMPLES 38 to 42

The pressure sensitive adhesive thermal syrup of IOA/AA 90/10 was provided with cellulose powder particles varying in size as showed in table A. Variation in particle size of the cellulose powder as a filler shows a dramatic increase in tensile strength and then a drop off with increasing particle size. Solution viscosity increased rapidly at a given point. The filler was present in a constant amount of 5 phr. Table 8 summarizes the results. The amount of HDDA crosslinking agent was 0.12% by weight.

TABLE 8

| Ex. No. | Material Type | Loading (phr) | Viscosity (mPas) | 90° Peel Adh. A (N/dm) | Tensile (N/mm²) | Elong. (%) |
|---|---|---|---|---|---|---|
| Contr. 5 | none | 0 | 5,760 | 160 | 0.611 | 1,014 |
| 38 | A | 5 | 6,840 | 138 | 1.152 | 887 |
| 39 | B | 5 | 9,500 | 148 | 1.132 | 846 |
| 40 | C | 5 | 9,600 | 132 | 1.153 | 847 |
| 41 | D | 5 | 33,000 | 123 | 0.763 | 373 |
| 42 | E | 5 | 27,000 | 135 | 0.689 | 383 |

EXAMPLE 43 to 46

A pressure sensitive adhesive of IOA/AA (90/10) has been used to compare adhesion after water soaking of pressure sensitive adhesives of the invention with unfilled systems. The syrup as prepared in examples 38 to 42 was used also with 0.12% by weight HDDA crosslinking agent. Table 9 summarizes the results. From this table can be derived that water soaking has almost no influence on the adhesion when cellulose powder was used as filler. If hydrophobic fumed silica (material J) is used, then an improved adhesion with increasing amounts of fillers can be monitored (see comparative examples ref. 1 to 3).

However, the adhesion value after water soaking in the silica filled system is substantially less when compared with the water-soaked materials of the invention.

TABLE 9

| Ex. No. | Material Type | Loading (phr) | 90° Peel Adh. C (before water soaking) (N/dm) | 90° Peel Adh. D (after water soaking) (N/dm) |
|---|---|---|---|---|
| contr. 6 | none | 0 | 259 | 104 |
| 43 | A | 3.3 | 231 | 224 |
| 44 | A | 6.7 | 213 | 206 |
| 45 | A | 13.3 | 161 | 167 |
| 46 | A | 20.0 | 121 | 122 |
| ref. 1 | J | 4.2 | 303 | 87 |
| ref. 2 | J | 8.7 | 299 | 99 |

TABLE 9-continued

| | Material | | 90° Peel | |
|---|---|---|---|---|
| Ex. No. | Type | Loading (phr) | Adh. C (before water soaking) (N/dm) | Adh. D (after water soaking (N/dm) |
| ref. 3 | J | 13.6 | 288 | 146 |

EXAMPLE 47

The pressure sensitive adhesive of example 47 was prepared as described in examples 38 to 42 using a thermal syrup with a monomer ratio IOA/AA 90/10. Control experiment 7 did not contain cellulose powder.

Table 10 shows properties after aging under hot and humid conditions.

TABLE 10

| | 90° Peel (N/dm) | | | |
|---|---|---|---|---|
| Ex. No | Adh. A | Adh. L | Adh. C | Adh. E |
| 47 | 215 | 254 | 174 | 246 |
| contr. 7 | 270 | 150 | 291 | 101 |

From the table it becomes evident that the cellulose powder pressure-sensitive adhesive shows an increase in adhesion under humid conditions.

EXAMPLES 48 and 49

A pressure sensitive adhesive system of example 4 was investigated regarding plasticizer resistance (ex. 48) as compared to non filled pressure sensitive adhesive (Ex. 49) based on IOA (100%). The pressure-sensitive adhesive of Example 49 was as described in control experiment contr.1.

The surface of the plasticized PVC material was cleaned with isopropanol before the article comprising the pressure sensitive adhesive of the invention was applied. The results are summarized in Table 11.

TABLE 11

| | 90° Peel (N/dm) on plasticized PVC | |
|---|---|---|
| Ex. No. | Adh. J (after 20 min.) | Adh. K (after 3 days) |
| 48 (with cellulose powder) | 213 | 201 |
| 49 (no cellulose powder) | 121 | 124 |

EXAMPLE 50 to 54

To a thermal syrup (polymerization was conducted according to examples 38 to 42) various amounts of cotton lint (BL 300, material H) and fumed silica (Aerosil from Degussa, Germany) in a ratio of 2.5:1 were added and thoroughly mixed with stirring. The mixture was coated on a support to a thickness of about 0.8 mm. The reaction was completed by UV treatment. The photoinitiator Irgacure 651 was present in amounts 0.5 % by weight and the crosslinking agent was present in the amount of 0.24% by weight. The properties of the product which can be used as a transfer tape are given in table 12. Control 8 experiment did not contain cotton lint/fumed silica.

TABLE 12

| | Material | | Static Shear A (min) | 90° Peel Adh. A (N/dm) | Tensile (N/mm$^2$) | Elong. (%) |
|---|---|---|---|---|---|---|
| Ex. No. | Type 2.5:1 | Loading (phr) | | | | |
| Contr. 8 | — | — | 299 | 132 | 0.83 | 758 |
| 50 | H/J | 1,5 | 1,225 | 135 | 0.72 | 613 |
| 51 | H/J | 3,0 | 1,900 | 131 | 0.94 | 612 |
| 52 | H/J | 4,5 | 2,780 | 130 | 1.08 | 574 |
| 53 | H/J | 6,0 | 5,517 | 128 | 1.21 | 547 |
| 54 | H/J | 7,5 | 6,993 | 127 | 1.24 | 494 |

Static shear was measured on samples of 1.27 cm × 2.54 cm.

COMPARATIVE EXPERIMENTS

Reference Examples 4 to 10

IOA was present in amounts of 100% by weight, the UV radical chain initiator (Irgacure 651) was present in amounts of 0.1 phr and the pigment ER4946 was present in amounts of 0.1 phr. These experiments correspond directly with examples 5 to 11 of the invention with the exception of the material polysaccharide.

Table 13 shows the effects of variation of the difunctional crosslinker HDDA but with no polysaccharide present. Materials show low tensile strength and low elongation at break indicating poor internal strength. This experiment shows that crosslinkers can be used to increase the tensile strength to some extent. Adhesion to paper drops dramatically but is still not low enough for repositionability from some sensitive surfaces.

TABLE 13

| Ref. Ex. No. | HDDA (phr) | Static Shear (min) | | 90° Peel (N/dm) | | Tensile (N/mm$^2$) | Elong. (%) |
|---|---|---|---|---|---|---|---|
| | | Shear B | Shear C | Adh. F | Adh. G | | |
| 4 | 0.13 | 10,000+ | 1,805 | 86 | 102 | 0.120 | 492 |
| 5 | 0.18 | 10,000+ | 932 | 69 | 79 | 0.135 | 420 |
| 6 | 0.23 | 10,000+ | 572 | 57 | 67 | 0.146 | 361 |
| 7 | 0.28 | 10,000+ | 195 | 48 | 53 | 0.148 | 294 |
| 8 | 0.33 | 4,410 | 200 | 40 | 43 | 0.150 | 252 |

TABLE 13-continued

| Ref. Ex. No. | HDDA (phr) | Static Shear (min) | | 90° Peel (N/dm) | | Tensile (N/mm²) | Elong. (%) |
|---|---|---|---|---|---|---|---|
| | | Shear B | Shear C | Adh. F | Adh. G | | |
| 9 | 0.38 | 240 | 170 | 36 | 39 | 0.176 | 236 |
| 10 | 0.43 | 104 | 140 | 32 | 35 | 0.185 | 202 |

Reference Examples 11 to 14

It must be noted that table 14 shows the data which were obtained when cellulose powder was added after polymerization of the acrylic monomers. From this data it becomes evident that viscosity is increased and adhesion is reduced substantially already at a loading of 12 phr.

An acrylic pressure sensitive adhesive having a monomer ration of 95.5% by weight isooctylacrylate (IOA) and 4.5% by weight acrylic acid (AA) was prepared as an emulsion by standard thermal initiation techniques. After the polymerization was complete the aqueous medium was evaporated.

The solid polymer was than dispersed in a mixture of heptane 70% and isopropanol (30%) at 25% solids. Cellulose powder (material type A) was added to this solution in increasing amounts.

TABLE 14

| Ref. | Material | | Viscosity (mPas) | Static Shear A (min) | 90° Peel Adh. A (N/dm) |
|---|---|---|---|---|---|
| | Type | Loading (phr) | | | |
| 11 | none | 0 | 4,880 | 2,375 | 87 |
| 12 | A | 4 | 5,451 | 1,847 | 57 |
| 13 | A | 8 | 6,080 | 1,989 | 35 |
| 14 | A | 12 | 7,188 | 2,259 | 10 |

Reference Example 15 to 24

Table 15 shows the data which were obtained by substituting the natural polysaccharide materials of the invention by derivatives of natural polysaccharides such as methylcellulose (a cellulose ether) and cellulose-acetobutyrate (cellulosic ester). To a thermal syrup IOA/AA (90/10) these covalently cellulose derivatives have been added and processed as described in examples 1 to 4.

The data demonstrate that the cellulose ethers and esters are not suitable as a filler in a pressure sensitive adhesive of the present invention.

Material K causes the shear value to fall dramatically even at loading of 15 phr. Material L and material M both have dramatic effects on both the elongation and peel adhesion values. In summary materials K, L and M do not preserve the balance between peel adhesion and static shear properties. They destroy the desired balance even at very low loadings.

TABLE 15

| Ref. Ex. No. | Material | | Static Shear A (min) | 90° Peel Adh. A (N/dm) | Tensile N/mm² | Elong. (%) |
|---|---|---|---|---|---|---|
| | Type | Loading (phr) | | | | |
| 12 | none | 0 | 10,000+ | 226 | 0.62 | 606 |
| 13 | K | 5 | 1.250 | 157 | 0.61 | 620 |
| 14 | K | 10 | <10 sec (ad) | 132 | 0.89 | 690 |
| 15 | K | 15 | <10 sec (ad) | 121 | 1.03 | 652 |
| 16 | L | 5 | 10,000+ | 173 | 1.19 | 800 |
| 17 | L | 10 | 10,000+ | 113 | 1.16 | 360 |
| 18 | L | 15 | 10,000+ | 13 | 2.76 | 30 |
| 19 | M | 5 | 10,000+ | 120 | 1.2 | 700 |
| 20 | M | 10 | 10,000+ | 95 | 1.4 | 360 |
| 21 | M | 15 | 10,000+ | 35 | 1.6 | 130 |

Comment: CAB-381-0.1 and 0.5 are described in the Japanese patent application 59-204673, Dicell Kagaku Kogyo K.K.

What is claimed is:

1. A pressure sensitive adhesive obtainable by a process comprising polymerizing an ester of acrylic or methacrylic acid having a nontertiary alcohol comprising 4 to 12 carbon atoms in the alkyl chain (component A) in the presence of a substantially purified cellulose fiber substantially all of which has a fiber length in the range of about 10 to 200 μm (component B), radical chain initiators (component C).

2. The pressure sensitive adhesive of claim 1, wherein a reinforcing comonomer (component D) is present which is copolymerizable with component A.

3. The pressure sensitive adhesive of claim 1, wherein a plasticizer, a tackifier, or a filler or a combination of two or more of the foregoing are present.

4. The pressure sensitive adhesive of claim 2, wherein component D is selected from the group consisting of acrylic acid, methacrylic acid, itaconic acid, maleic acid and N-vinyl-2-pyrrolidone (NVP).

5. The pressure sensitive adhesive of claim 1, wherein substantially all of the cellulose fibers have an aspect ratio of less than 5.

6. The pressure sensitive adhesive of claim 1, wherein the cellulose is derived from wood, cotton wool, flax or ramie.

7. The pressure sensitive adhesive according to claim 1, wherein a crosslinking agent (component E) is present.

8. The pressure sensitive adhesive of claim 7, wherein the crosslinking agent is a polyacrylic functional monomer.

9. The pressure sensitive adhesive according to claim 1, wherein component A is present in amounts of about 100 parts by weight, component B is present in amounts of from 0.1 to 70 per hundred parts resin (phr), component C is present in amounts of from 0.02 to 1.0 phr, component D is present in amounts of from 0 to 40% by weight based on the amount of sum of components A and D, and component E is present in amounts of from 0.02 to 1.0 phr.

10. The pressure-sensitive adhesive of claim 1, wherein essentially all of said cellulose fibers have a fiber length of less than about 30 μm.

* * * * *

UNITED STATES PATENT AND TRADEMARK OFFICE
CERTIFICATE OF CORRECTION

PATENT NO. : 5,536,778
DATED : July 16, 1996
INVENTOR(S) : Kreckel et al.

It is certified that error appears in the above-indentified patent and that said Letters Patent is hereby corrected as shown below:

Col. 5, line 32, Delete "1,0" and insert --1.0--
Col. 5, line 44, Delete "control is" and insert --controls--
Col. 5, line 44, Delete "of" and insert --off--
Col. 9, line 25, Delete "terphthalate" and insert --terephthalate--
Col. 10, line 37, Delete "tht" and insert --that--
Col. 14, line 23, Delete "photopolymerisa-" and insert --photopolymeriza--
Col. 14, Table 4, #19, Under Shear B delete "1.577" and insert --1,577--
Col. 15, line 17, Insert --%-- after 10

Signed and Sealed this

Twenty-first Day of January, 1997

Attest:

BRUCE LEHMAN

Attesting Officer

Commissioner of Patents and Trademarks